US007699700B2

(12) United States Patent
Omomo

(10) Patent No.: US 7,699,700 B2
(45) Date of Patent: Apr. 20, 2010

(54) MOTOR DRIVE DEVICE

(75) Inventor: Shingo Omomo, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1246 days.

(21) Appl. No.: 10/987,302

(22) Filed: Nov. 15, 2004

(65) Prior Publication Data

US 2005/0104288 A1 May 19, 2005

(30) Foreign Application Priority Data

Nov. 14, 2003 (JP) .......................... P2003-385736

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/22; 242/390.9; 273/142 R; 273/143 R; 318/696; 463/1; 463/16; 463/20; 463/25

(58) Field of Classification Search .................. 463/16, 463/20, 22; 318/362
See application file for complete search history.

(56) References Cited

U.S. PATENT DOCUMENTS 3,268,199 A * 8/1966 Kordyban et al. ........... 220/632
3,733,075 A 5/1973 Hooker et al.
4,071,246 A 1/1978 Hooker
4,621,815 A * 11/1986 Yamamoto .............. 273/143 R
4,687,981 A * 8/1987 Okada ........................ 318/696
4,912,389 A * 3/1990 Eguchi ....................... 318/696
4,988,938 A * 1/1991 Ito et al. ..................... 318/696
5,058,893 A * 10/1991 Dickinson et al. ....... 273/143 R
5,152,529 A * 10/1992 Okada ......................... 463/20
5,388,829 A * 2/1995 Holmes .................. 273/143 R
5,683,296 A * 11/1997 Rasmussen .................. 463/20
5,688,172 A * 11/1997 Lorenzo Regidor .......... 463/20
5,752,881 A * 5/1998 Inoue .......................... 463/20
6,102,396 A * 8/2000 Liu ........................ 273/143 R
6,129,355 A * 10/2000 Hahn et al. ............. 273/142 R
6,361,179 B1 * 3/2002 Miyabukuro ................ 359/879
6,540,227 B2 * 4/2003 Inoue ..................... 273/143 R
7,043,860 B2 * 5/2006 Inoue .......................... 40/582
7,371,172 B2 * 5/2008 Inoue .......................... 463/20
2002/0166916 A1 * 11/2002 Fujii et al. ............... 242/390.9
2002/0180147 A1 * 12/2002 Inoue ..................... 273/143 R
2003/0116669 A1 * 6/2003 Fujii et al. .................. 242/383
2003/0146571 A1 * 8/2003 Inoue ..................... 273/143 R (Continued)

FOREIGN PATENT DOCUMENTS

AU 2004200890 A1 12/2004

(Continued)

*Primary Examiner*—John M. Hotaling, II
*Assistant Examiner*—Paul A. D'Agostino

(57) ABSTRACT

A motor drive device is disclosed having an input-side gear through which rotation of a stepping motor is transferred to a reel with a predetermined speed reduction ratio, the reel driven by the stepping motor via the input-side gear and is formed in one-piece construction with the input-side gear, and a rotary shaft support section that rotatably supports the reel. The rotary shaft support section has one end formed with a wall portion in a direction perpendicular to a longitudinal direction of the rotary shaft support section and the other end provided with a press section by which the rotatably supported reel is pressed toward the wall portion.

5 Claims, 8 Drawing Sheets

U.S. PATENT DOCUMENTS

2008/0128542 A1 * 6/2008 Majima et al. .............. 242/372

FOREIGN PATENT DOCUMENTS

AU 2004202611 A1 1/2005
EP 1 475 759 A1 11/2004
JP 58-162881 U 10/1983
JP 63-290593 A 11/1988
JP 09-327553 A 12/1997
JP 10-071240 3/1998
JP 2002-065939 A 3/2002

* cited by examiner

MOTOR DRIVE DEVICE

CROSS REFERENCE TO RELATED APPLICATIONS

This invention is based upon and claims the benefit of priority under 35 U. S. C. § 119 to the prior Japanese Patent Application No. 2003-385736, filed on Nov. 14, 2003; the entire contents of which are incorporated herein by reference.

There are co-pending applications: a U.S. patent application Ser. No. 10/697,085 entitled to "Motor stop control device" filed in the United States on Oct. 31, 2003; a U.S. patent application Ser. No. 10/834,182 entitled to "Motor stop control device utilizable for reel-type gaming machine" filed in the United States on Apr. 29, 2004; and a U.S. patent application Ser. No. 10/866,816 entitled to "Reel drive device utilizable in gaming machine" filed in the United States on Jun. 15, 2004.

BACKGROUND OF THE INVENTION

1. Field of the Invention

The present invention relates to a motor drive device including a motor as a drive source for a reel with a plurality of symbols.

2. Description of the Related Art

Heretofore, in the related motor drive device for a gaming machine, such as a slot machine, comprises a support shaft which is inserted into a central path of a reel. The reel is formed in one-piece construction with a gear through which rotational torque being generated by a stepping motor is transferred to the reel. By the rotational torque, the reel is rotated around a center of the support shaft. According to the related motor drive device having the above mentioned structure, the gear indirectly transfers rotational torque of the stepping motor to the reel, and the motor drive device enables the stepping motor to bear load greater than that of a direct-drive type motor drive device (see, for instance, related art: Japanese Patent Application Laid Open Publication No. 10-71240) in which a drive shaft of the stepping motor is directly pressed and fitted to a central path of the reel.

Meanwhile, to rotate the support shaft inside the central path, a slight clearance between the inner peripheral of the central path of the reel and the outer peripheral of the support shaft is provided, i. e., the diameter of the central path of the reel should be greater than the diameter of the support shaft. Hence, the reel shakes leftward or rightward as viewed from a player (hereinafter, referred to as "a reel shaking") during start-up or stop operation of the motor commensurate to the increase in dimension of the clearance. As used herein, the term "the reel shakings" refers to movements in that the reel shakes in a direction as shown by an arrow AR1 in FIG. 5.

The present invention has been completed to address the above issue and has an object to provide a motor drive device that is able to minimize the reel shakings of a reel during start-up or stop operations of the reel.

BRIEF SUMMARY OF THE INVENTION

To achieve the above object, according to the present invention, there is provided a motor drive device comprising: a reel; a speed reduction gear which is formed in one-piece construction with the reel and transfers rotation of a motor to the reel with a predetermined speed reduction ratio; a support member for rotatably supporting the reel; a wall portion formed on one end of the support member in a direction perpendicular to a longitudinal direction of the support member; and a press device disposed on the other end of the support member for pressing the reel, which is rotatably supported by the support member, toward the wall portion.

DETAILED DESCRIPTION OF THE INVENTION

Basic Structure of a Motor Drive Device

Hereunder, motor drive devices of an embodiment according to the present invention is described below with reference to the accompanying drawings.

Figure 1:
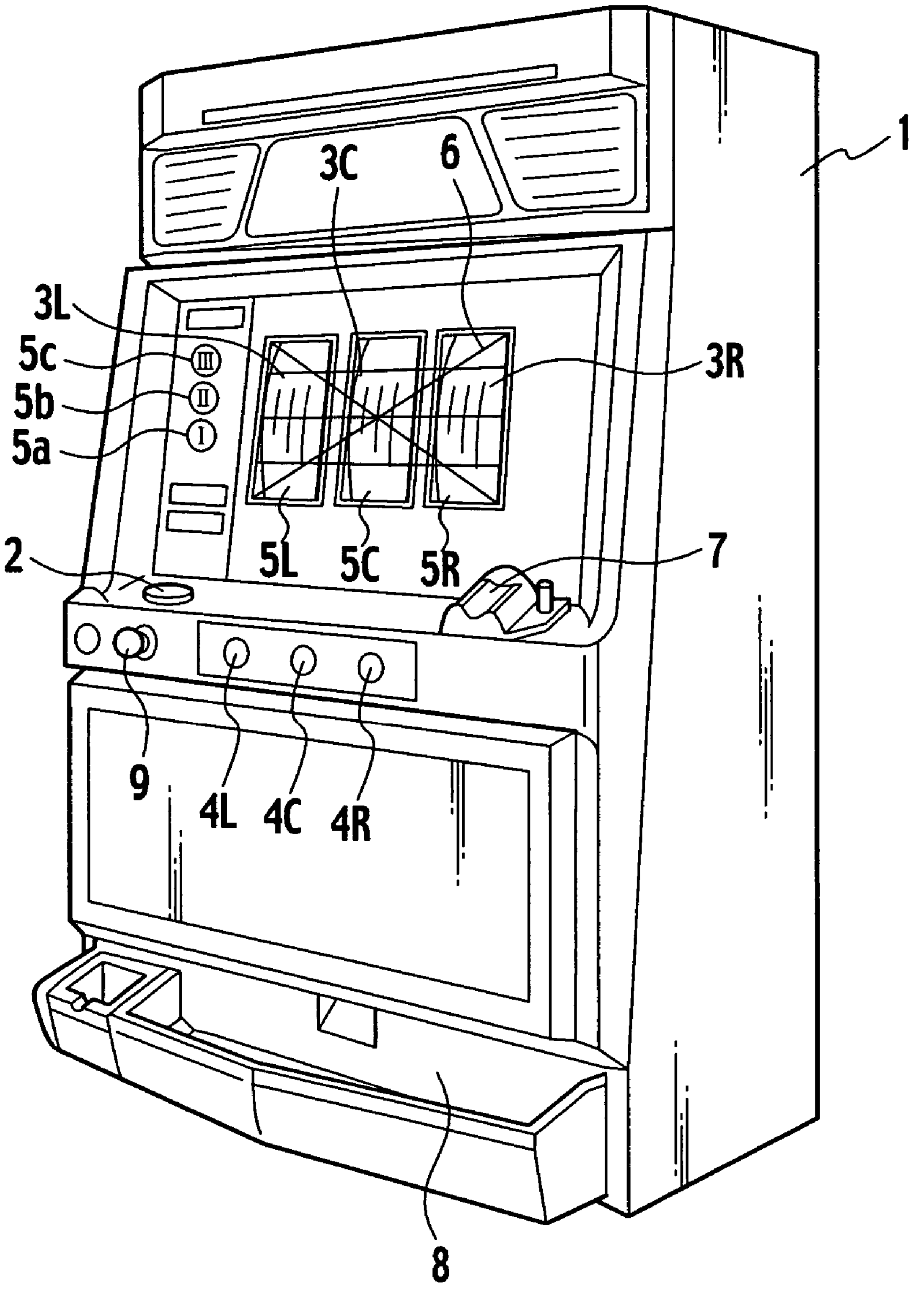
FIG. 1 is a perspective view illustrating a gaming machine of an embodiment according to the present invention.

As shown in FIG. 1, a gaming machine 1 comprises a cabinet whose front surface is formed with three panel display windows 5L, 5C, 5R. Information, such as symbols, formed on reels 3L, 3C, 3R, which form a reel unit, are viewed by a player through the panel display windows 5L, 5C, 5R, respectively. Also, indicated on the panel display windows 5L, 5C, 5R are pay lines 6 of which three lines extend in a lateral direction and two lines extend in oblique lines. The number of pay lines 6 to be activated is determined depending on the number of coins to be inserted through a coin insertion slot 7.

That is, upon inserting a coin (not shown), a display section 5*a* is turned on and one line of the pay line 6 is activated. With two coins inserted, for instance, display section 5*a*, 5*b* are turned on and all the pay lines 6 in the lateral direction are activated. Likewise, when inserting three or more coins, display section 5*a*, 5*b*, 5*c* are turned on and all the pay lines 6 are activated.

Upon operating a start lever 9 after inserting the coins into the coin insertion slot 7, the respective reels 3L, 3C, 3R begin to rotate. Upon operation of the player to push stop buttons 4L, 4C, 4R, associated with the respective reels 3L, 3C, 3R, which are configured to stop the respective reels 3L, 3C, 3R, the respective reels 3L, 3C, 3R cease to rotate at respective stop positions. Combinations of symbols appearing on the respective reels 3L, 3C, 3R, which can be viewed through the respective panel display windows 5L, 5C, 5R, at respective stop positions allow a winning mode to be discriminated. That is, with a combination of the symbols corresponding to a predetermined winning mode, it is judged that the player has a winning at which time the gaming machine pays out a number of coins depending on the resulting winning mode. Inanition, medals, tokens, prepaid cards, or prepaid tickets are also can be used instead of using coins.

Figure 2:
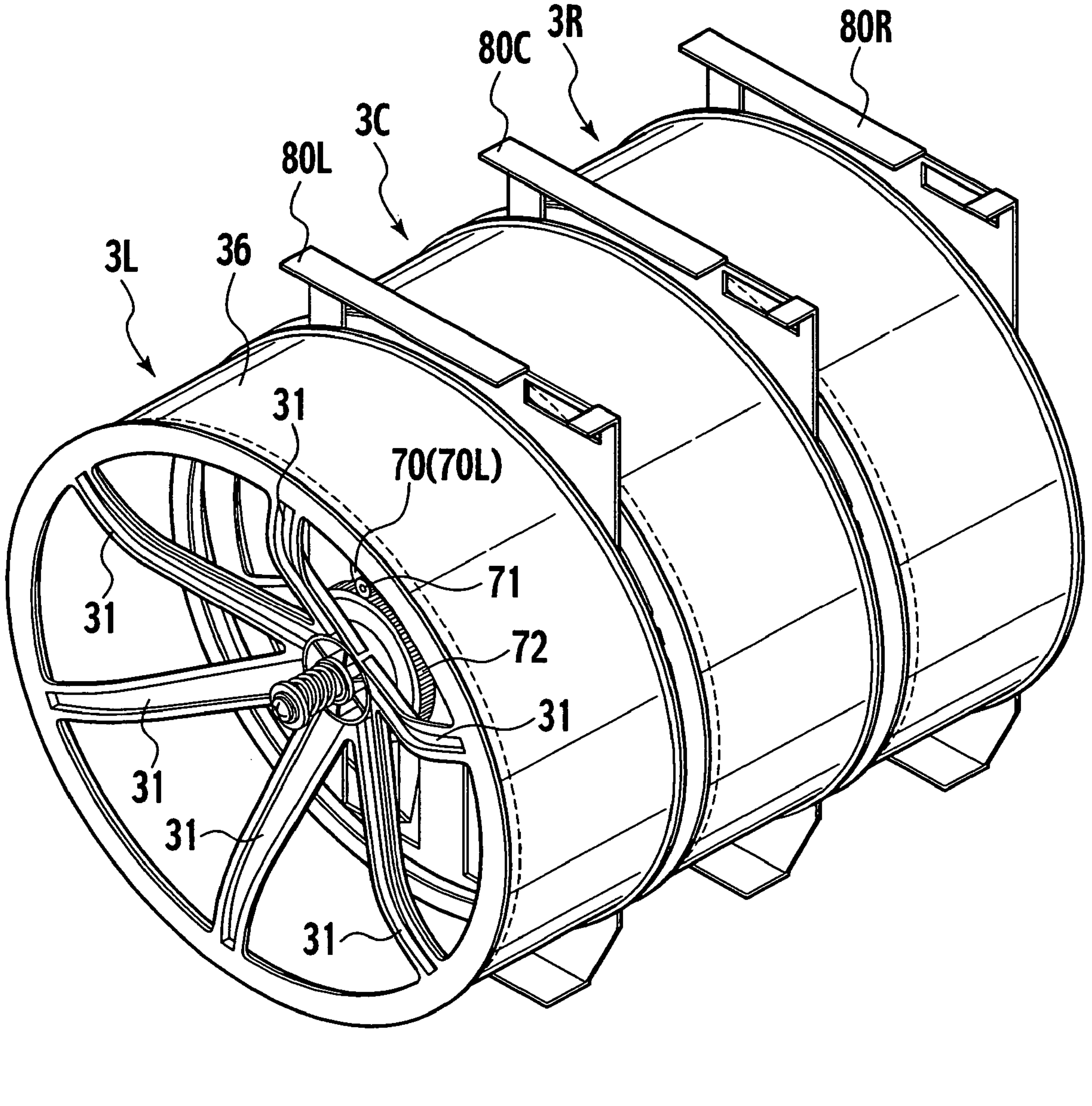
FIG. 2 is a perspective view illustrating a structure forming part of the embodiment with reels viewed in an oblique direction.

As shown in FIG. 2, the reel unit is comprised of three support plates 80L, 80C, 80R, the three reels 3L, 3C, 3R disposed inside the support plates 80L, 80C, 80R, respectively, and three PM type stepping motors 70L, 70C, 70R (70C, 70R are not shown in FIG. 2, refer to FIG. 9) with which the three reels 3L, 3C, 3R are independently driven, respectively.

Also, hereunder, to simplify description, among the three reels 3L, 3C, 3R, the three support plates 80L, 80C, 80R and the three stepping motors 70L, 70C, 70R, description is made of component parts limited to the leftmost reel 3L (hereinafter merely referred to as "reel 3"), the support plate 80L (hereinafter merely referred to as "support plate 80") and the stepping motor 70L (hereinafter merely referred to as "stepping motor 70"). Meanwhile, hereunder, it is intended that the other reels 3C, 3R, the support plates 80C, 80R and the stepping motors 70C, 70R have similar structures.

Figure 3:
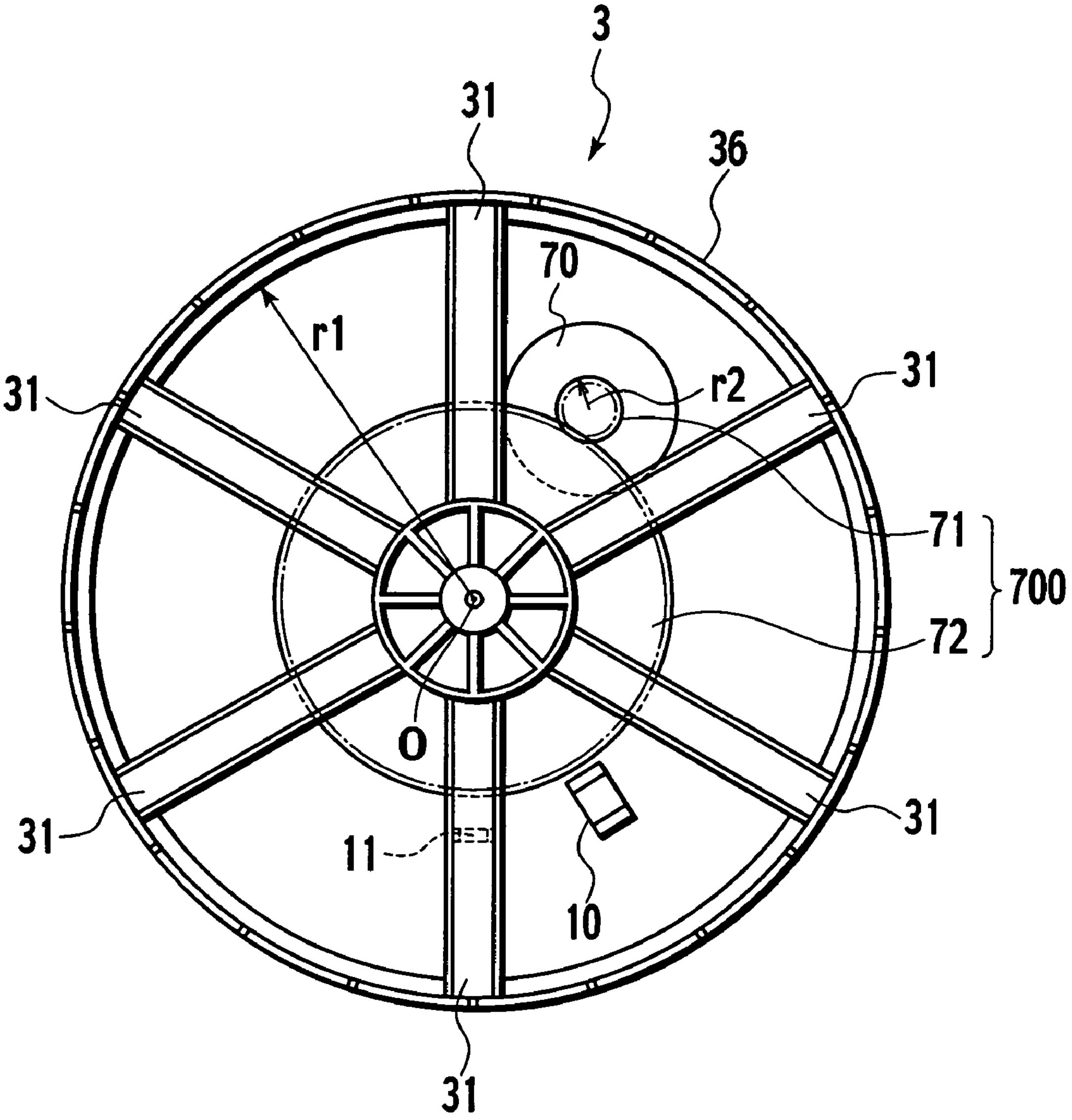
FIG. 3 is a plan view of a reel forming part of the embodiment.

As shown in FIG. 3, a position sensor (detector) 10 is mounted on the support plate 80 (not shown in this figure) in an area inside a radius r1 of the reel 3 and which serves as a reel position detection circuit to detect a rotary position of the reel 3. The reel 3 is rotatably pivoted on a reel post 76 (a support member) that extends from a plane of the support plate 80 in a direction perpendicular thereto (see FIG. 4A).

As shown in FIG. 3, the reel 3 is comprised of six arms 31, which extend from a center "O" in a radial direction, and a tubular member 36 with which outer distal ends of the respective arms 31 are mutually interconnected in a unitary structure, respectively. A detection piece 11 is provided on one of the arms 31 at a position (a reference position) to be detected by the position sensor 10. As one of the detecting method by using the detection piece 11 and the position sensor 10, the detection piece 11 is so arranged that each time the reel 3 rotates one turn, the detection piece 11 passes across the position sensor 10 one time. Each time the detection piece 11 passes across the position sensor 10 by which the detection piece 11 is detected, thus, the rotation of the reel is detected, and thereafter a detection signal is outputted.

A rotation speed reduction mechanism 700 is disposed between a drive shaft 70*a* (see FIG. 5) of the stepping motor 70 and a rotary shaft of the reel 3 as shown in FIG. 3. The rotation speed reduction mechanism 700 serves to transfer rotation of the stepping motor 70 to the rotary shaft of the reel 3 at a predetermined speed reduction ratio.

As shown in FIG. 3, the rotation speed reduction mechanism 700 is comprised of two gears including an output-side gear (having a radius r2) 71 mounted on the rotary drive shaft 70*a* of the stepping motor 70, and an input-side gear 72 meshing with the output-side gear 71 and mounted on the reel 3 in concentric relation with a shaft support portion of the reel 3.

A gear reduction ratio (speed reduction ratio) R between the above-described output-side gear 71 and input-side gear 72 is obtained by the following formula:

$$R=Nsteps/LCM$$

where Nsteps denotes the necessary number of steps for rotating the stepping motor 70 once, and LCM denotes the Least Common Multiple of (Nsteps, and the number of symbols displayed on the reel 3).

Figure 4A:
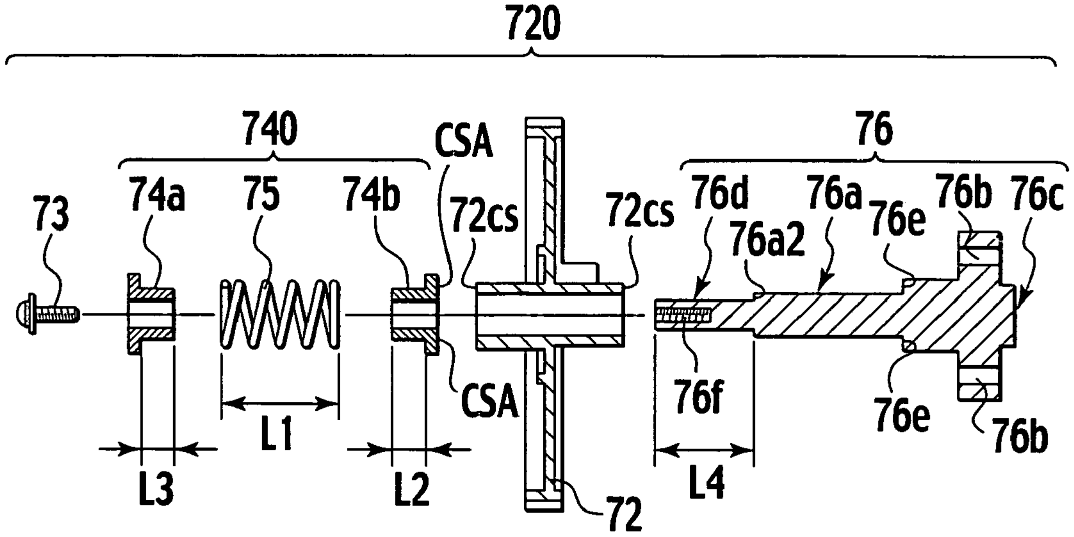
FIG. 4A is an exploded view illustrating structural members of a shaft support portion forming part of the present invention.

As shown in FIG. 4A, the shaft support portion 720 is comprised of a fixing member 73, a press section 740, the input-side gear 72 and the reel post (support member) 76. The reel post 76 includes a pivot shaft portion 76*a* to which the input-side gear 72 is inserted for rotational support, a position fixing portion 76*d* adapted to receive component parts for maintaining the reel 3 at a fixed position (see FIG. 4B), a protrusion 76*c* protruding from a side of the pivot shaft portion 76*a* toward the support plate 80 and fitted into a hole 81 of the support plate 80, a plurality of threaded holes 76*b* through which screws (not shown) are tightened to fixedly secure the reel post 76 to the support plate 80, a wall portion 76*e* formed on the pivot shaft portion 76*a* in a plane perpendicular to a longitudinal axis of the pivot shaft portion 76*a*, and a stop hole (threaded portion) 76*f* to which the fixing member 73 (such as a screw) is tightened in a stop position to preclude dropout of the input-side gear 72 via the press section 740.

Meanwhile, the position fixing portion 76*d*, the input-side gear 72, the pivot shaft portion 74*a*, and the threaded hole 74*b* are formed in an approximately D-shaped in cross section (see FIG. 4A).

The press section 740 is located on the other end of the pivot shaft portion 76*a* to serve as a press device to press the reel 3, which is rotatably supported on the pivot shaft portion 76*a*, toward the wall portion 76*e*. In the presently filed embodiment, the press section 740 includes collars 74*a*, 74*b* and a press member 75.

Figure 5:
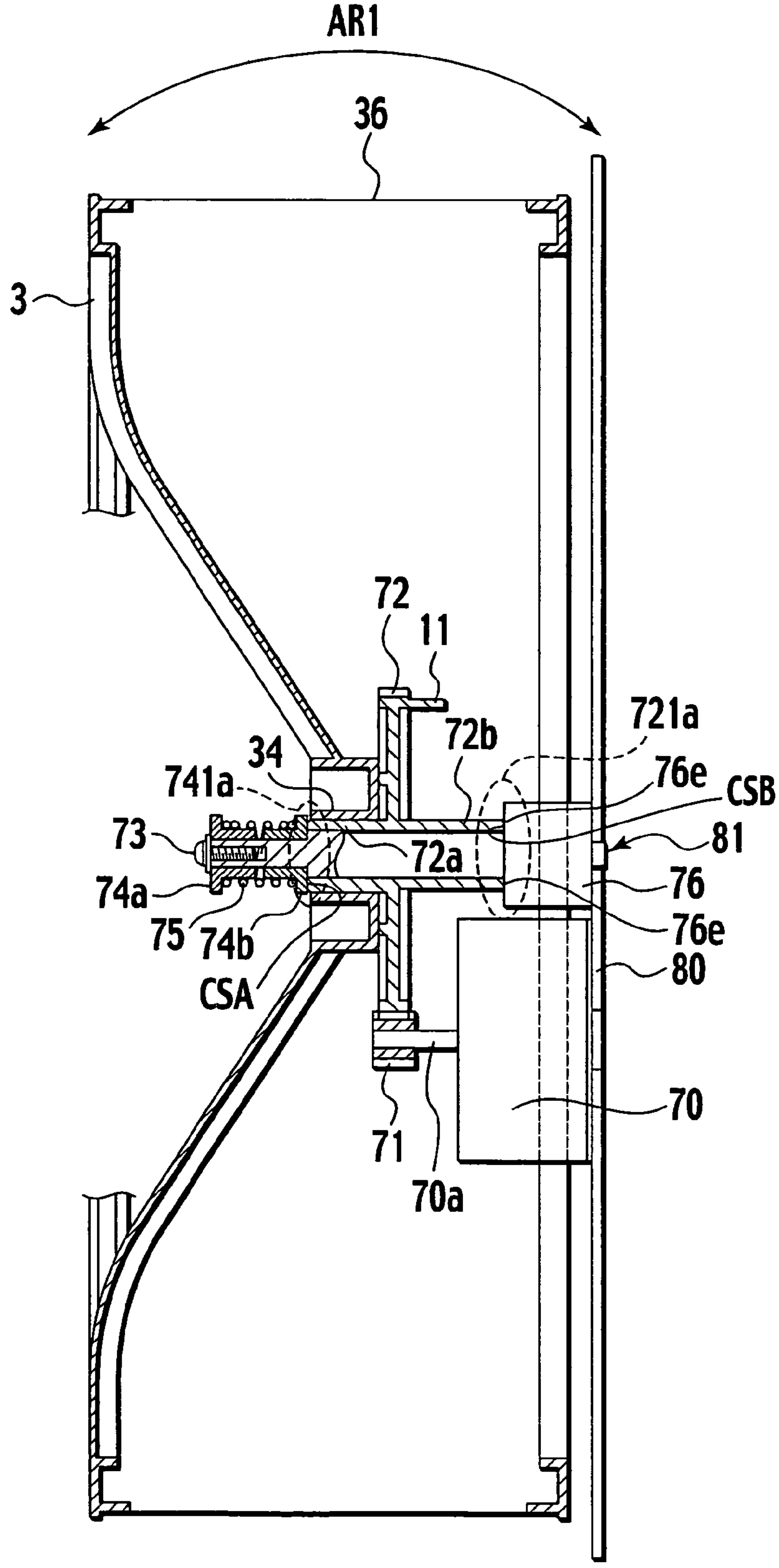
FIG. 5 is a cross sectional view illustrating a structure of the embodiment wherein the shaft support portion is mounted onto a support plate.

The collars 74*a*, 74*b* serve as members to fixedly hold the press member 75 in an appropriately fixed position. As shown in FIG. 5, an outer end surface (contact surface) CSA of the collar 74*b* is held in contact with the reel 3 or an end face 72*cs* of the input-side gear 72 (see FIG. 4A). The outer end surface CSA of the collar 74*b*, the end face 72*cs* of the input-side gear 72, and/or a surface 76*a*2 of the reel post 76 serving as a first contacting section 741*a*. Additionally, the end face 72*cs*, closer to the protrusion 76*c*, of the protrusion 72*b* and the wall portion 76*e*, with which the end face 72*cs* is held in contact, serve as a second contacting section 721*a*.

The press member 75 serves as a wall-portion press member that presses the reel 3, rotatably supported, toward the wall portion 76*e* by means of the collar 74*b* and may include a spring. With the presently filed embodiment, the spring 75 is used as the press member 75. As shown in FIG. 4A, after the input-side gear 72 is inserted into the pivot shaft portion 76*a*, the spring 75 is inserted into the position fixing portion 76*d* under a condition sandwiched between the collars 74*a*, 74*b*. In other words, the collars 74*a*, 74*b* have an inserted portion whose length L2, L3, respectively, and the inserted portions are inserted into the spring 75.

Figure 4B:
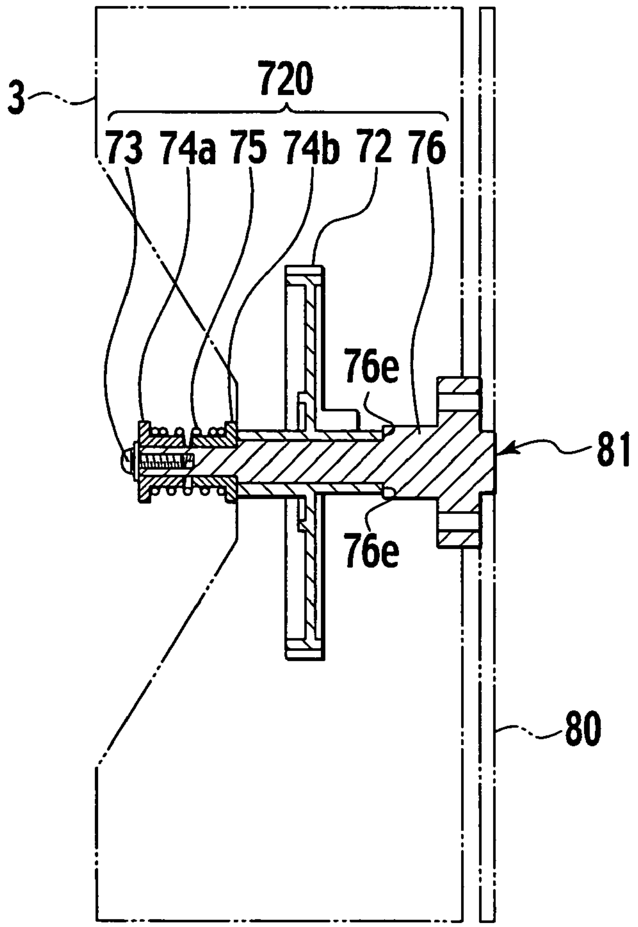
FIG. 4B is a cross sectional view illustrating an assembled state of the shaft support portion shown in FIG. 4A.

As shown in FIG. 4B, the fixing member 73 is screwed into the stop hole 76*f* to prevent dropout of the spring 75 interposed between the collars 74*a*, 74*b* that are inserted into the position fixing portion 76*d*. With the spring 75 fixedly held in place with the fixing member 73, a compression force of the spring 75 presses the input-side gear 72 toward the support plate 80 via the collar 74*b*. This action enables the reel 3 to be prevented from reel shakings during start-up or stop operations of the reel 3.

In other words, the pressing force of the spring presses the input-side gear 72 via the first contacting section 741 a and the pressing force delivered from the input-side gear 72 is then transferred through the second contacting section 721*a*, thereby pressing the reel 3 against the support plate 80 such that no reel shakings occur on the reel 3.

As will be understood from FIGS. 4A, 4B, further, a length L1 of the spring 75, appearing when no load is applied thereto, during start-up (or during stop) operation takes a value greater than the length (L2+L3). Also, suppose that a length of the position fixing portion 76*d* is L4, a relationship is given by L4>(L2+L3). Therefore, the fixing member 73 has a freedom in a tightening degree expressed by a value of length: {L1−(L2+L3)}. Stated another way, with the press section 740 structured with the two collars 74*a*, 74*b* whose total length is shorter than that of the spring 75, the pressing force of the spring 75 can be adjusted in the range of the length {L1−(L2+L3)}. That is, a pair of collar (first member) 74*a* and collar (second member) 74*b*, which are independently placed in face-to-face relation to one another, the spring 75, the fixing member 73 and the hole 76*f* of the reel post 76 form a pressing force adjusting means.

As shown in FIG. 5, the input-side gear 72 includes a spur gear with both end faces integrally formed with protrusions 72*a*, 72*b* axially extending along a direction perpendicular to the both end faces of the spur gear and having insertion holes to which the pivot shaft portion 76*a* is inserted along the axis perpendicular to the both end faces. One protrusion 72*b* is inserted into the pivot shaft portion 76*a* and extends toward the support plate 80. The other protrusion 72*a* is pressed and fitted to a hole 34 formed at a center of the reel 3. Accordingly, upon rotation of the output-side gear 71, the reel 3 and the input-side gear 72 integrally rotate around an axis of the pivot shaft portion 76*a* as a unit.

First Modified Form

Figure 6A:
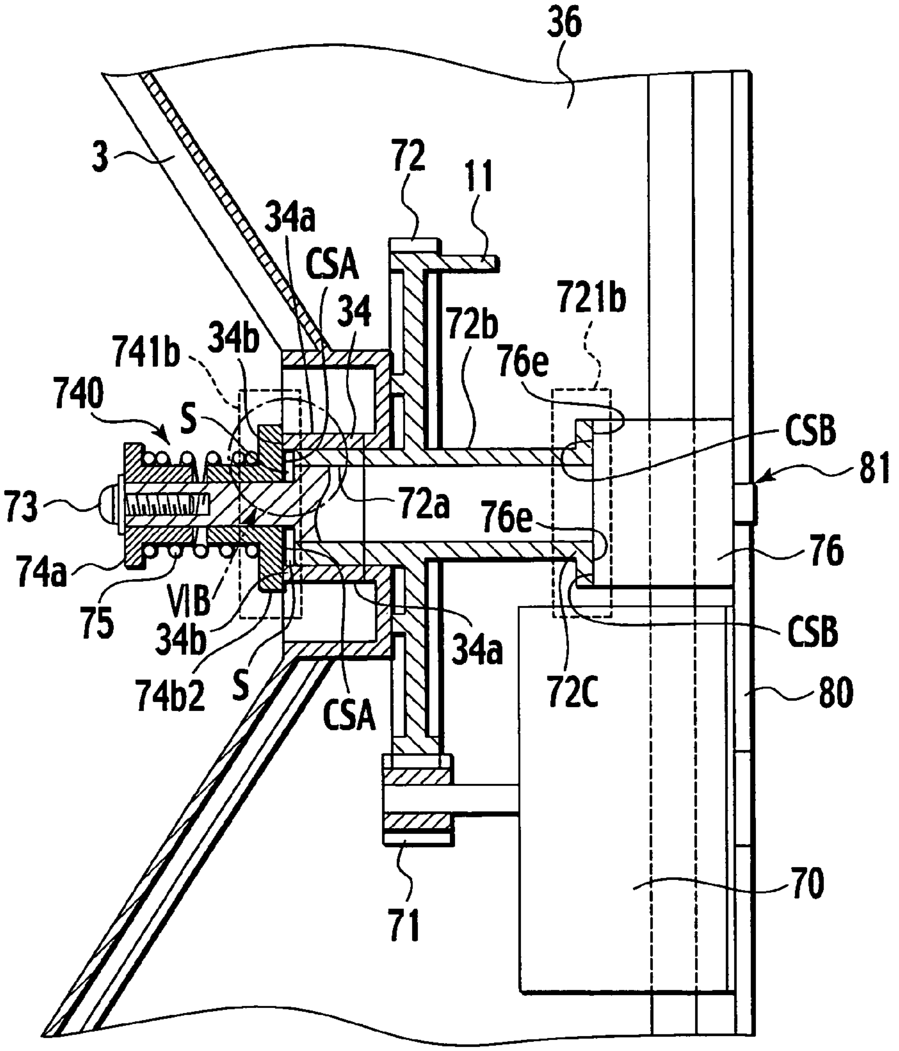
FIG. 6A is an enlarged cross sectional view illustrating a structure wherein a modified form of the shaft support portion of the present invention is mounted onto the support plate.
Figure 6B:
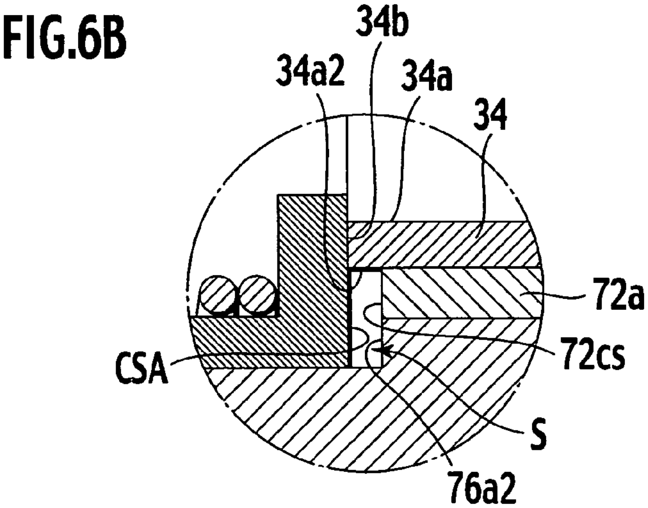
FIG. 6B is an enlarged cross sectional view illustrating an area being indicated as VIB in the FIG. 6A.

As shown in FIGS. 6A, 6B, the presently filed modified form includes a collar 74*b*2 with a diameter greater than an outer diameter of the press member 75. More particularly, the diameter of the collar 74*b*2 is greater than diameters of the press member 75 and an outer periphery 34*a* of the hole 34 formed at the center of the reel 3, and a contact surface CSA of the collar 74*b*2 is held in contact with a whole of an outer end surface (contact surface) 34*b* of the hole 34. In comparison with the structure shown in FIG. 5, the diameter of the contact surface CSA of the collar 74*b*2 is made greater than the diameter of outer periphery 34*a* of the hole 34, thereby causing the spring 75 to more reliably press the reel 3. Thus, the pressing force of the spring 75 can be transferred with no loss, thereby suppressing reel shakings of the reel 3 in a further effective manner.

With reference to FIGS. 6A, 6B, further, the contact surface CSA of the collar 74*b*2 and the outer end surface 34*b* of the hole 34, with which the contact surface CSA of the collar 74*b*2 is held in contact, form a first contacting section 741*b* of the presently filed modified form.

As shown in FIGS. 6A, 6B, furthermore, the protrusion 72*b* has one end, closer to the support plate 80, formed with a large diameter portion 72*c* whose outer end surface (contact surface) CSB is held in contact with the wall portion 76*e*. The contact surface CSB of the large diameter portion 72*c* and the wall portion 76*e* form a second contacting section 721*b* of the presently filed modified form. Also, the large diameter portion 72*c* includes an end face 72*cs*.

In particular, the diameter of the contact surface CSB and the wall portion 76*e* consisting the second contacting section 721*b* are larger than that of the press member 75. In addition, the contact surface CSB in contact with the wall portion 76*e*, and it is desirable that the diameter of the contact surface CSB is not less than that of the wall portion 76*e*. Further more, as shown in FIG. 6A, the diameter of the collar 74*b*2 is not less than that of the collar 74*a*. Due to the structure where the diameter of the contact surface CSB and the wall portion 76*e* are larger in diameter than the end face of the protrusion 72*b* between the wall portion 76*e* and an edge of the protrusion 72*b* shown in FIG. 5, the diameter of the contact surface CSB is larger than that of the structure shown in FIG. 5 to allow the contact surface CSB to bear the pressing force applied by the spring 75 via the reel 3 such that the reel shakings of the reel 3 can be further effectively eliminated during start-up or stop operations of the reel 3.

Moreover, while the presently filed modified form has been shown in a structure where (I) the outer diameter of the collar 74*b*2 is larger than that of the press member 75 and (II) the outer diameters of the wall portion 76*e* and the contact surface CSB which comprises the second contacting section 721*b* are larger than that of the press member 75, the present invention is not limited to such a structure with both requirements to be satisfied and may take a structure with only either one of the requirements (I), (II) to be satisfied.

In addition, as described in conjunction with the structures shown in FIGS. 4A, 4B, the presently filed modified form has a capability of adjusting the pressing force of the press section 740 with additional features described below.

That is, as shown in FIGS. 6A, 6B, with the presently filed modified form, an interspace S is defined among the contact surface CSA of the collar 74*b*2, an inner wall 34*a*2 of the hole 34 of the reel 3, the end face 72*cs* of the protrusion 72*a* and a surface (side wall) 76*a*2 of the pivot shaft portion 76*a* (see FIG. 4A). With the presently filed modified form, since the diameter of the collar 74*b*2 is larger than that of the outer end surface 34*a* of the hole 34, and the contact surface CSA and the outer end surface 34*b* of the hole 34 are held in contact with one another at all times, no need arises for the end face 72*cs* of the protrusion 72*a* and the contact surface CSA to be held in contact with one another at all times as shown in FIG. 6B. Therefore, the formation of the interspace S allows the fixing member 73 to be tightened or unscrewed for adjusting the pressing force in an increased range.

Second and Third Modified Forms

Also, the present invention is not limited to the embodiments described above and may be modified as described below. Various modifications described below include a felt 751, a washer 752 or a wave washer 753 (refer to FIGS. 7A to 8B).

Figure 7A:
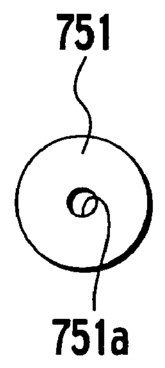
FIG. 7A is a plan view illustrating a felt forming part of a press section of a second modified form of the present invention.
Figure 7B:
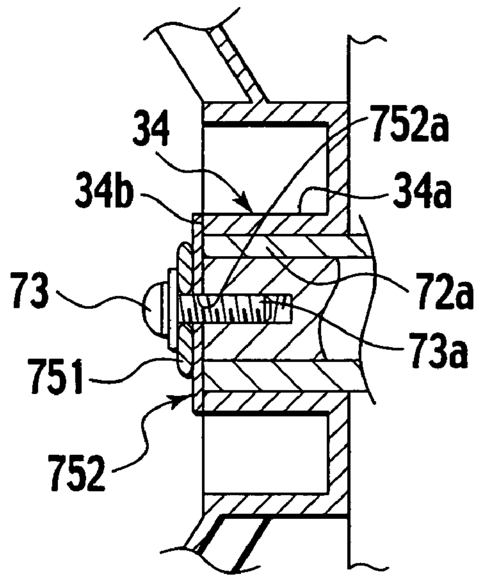
FIG. 7B is a cross sectional view illustrating a structure wherein the felt shown in FIG. 7A is assembled to the shaft support portion.

As shown in FIGS. 7A and 7B, the felt 751 has a circular shape and has a center formed with an aperture 751*a* through which a shaft 73*a* (for instance, in the form a threaded portion in case of a screw) of the fixing member 73 can be inserted.

The washer 752 has a circular shape and has a center formed with an aperture 752*a* through which the shaft 73*a* (for instance, the threaded portion in case of the screw) of the fixing member 73 can be inserted. Further, the washer 752 has a surface available to be held in contact with partial areas of the protrusion 72*a* and the reel 3.

In this modified form, an outer diameter of the washer 752 is larger than that of the collar 74*b* shown in FIG. 5 with a resultant further increase in contact surface area with the outer end surface 34*b* of the hole 34. Therefore, the presence of the washer 752 enables the reel shakings of the reel 3 to be effectively eliminated to a greater degree than that achieved in the structure of the first embodiment. Also, with the presently filed modified form, the washer 752 and the outer end surface 34*b* of the hole 34 serve as the first contacting section.

Figure 8A:
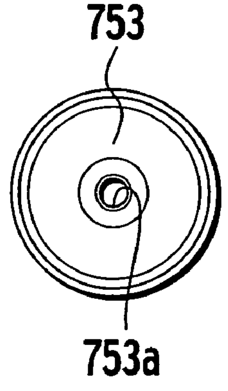
FIG. 8A is a plan view illustrating a wave washer forming part of a press section of a third modified form of the present invention.
Figure 8B:
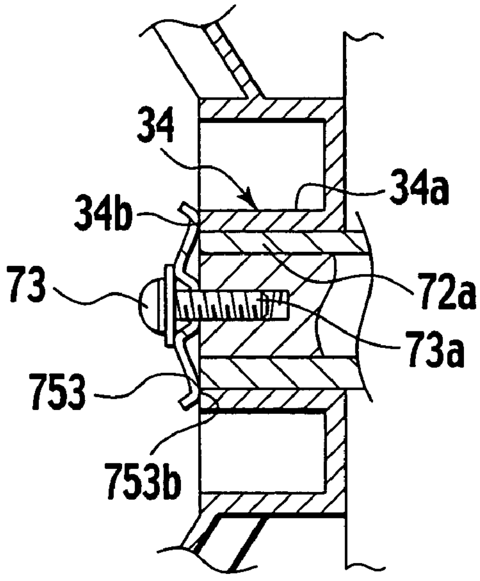
FIG. 8B is a cross sectional view illustrating a structure wherein the wave washer shown in FIG. 8A is assembled to the shaft support portion.

As shown in FIGS. 8A and 8B, the wave washer 753 has a cross sectional configuration that has a waved shape extending from a center toward an outer periphery and has a central area formed with an aperture 753*a* through which the fixing member 73 can be inserted. The wave washer 753 is formed with a contact surface 753*b* that is available to be held in contact with the protrusion 72*a* and a part (the hole 34) of the reel 3.

In such a case, an outer diameter of the wave washer 753 is larger than that of the collar 74*b* shown in FIG. 5 with a resultant further increase in contact surface area with the outer end surface 34*b* of the hole 34. Therefore, the presence of the wave washer 753 prevents the reel 3 shaking. Also, with the presently filed modified form, the wave washer 753 and the outer end surface 34*b* of the hole 34 serve as the first contacting section.

Figure 9:
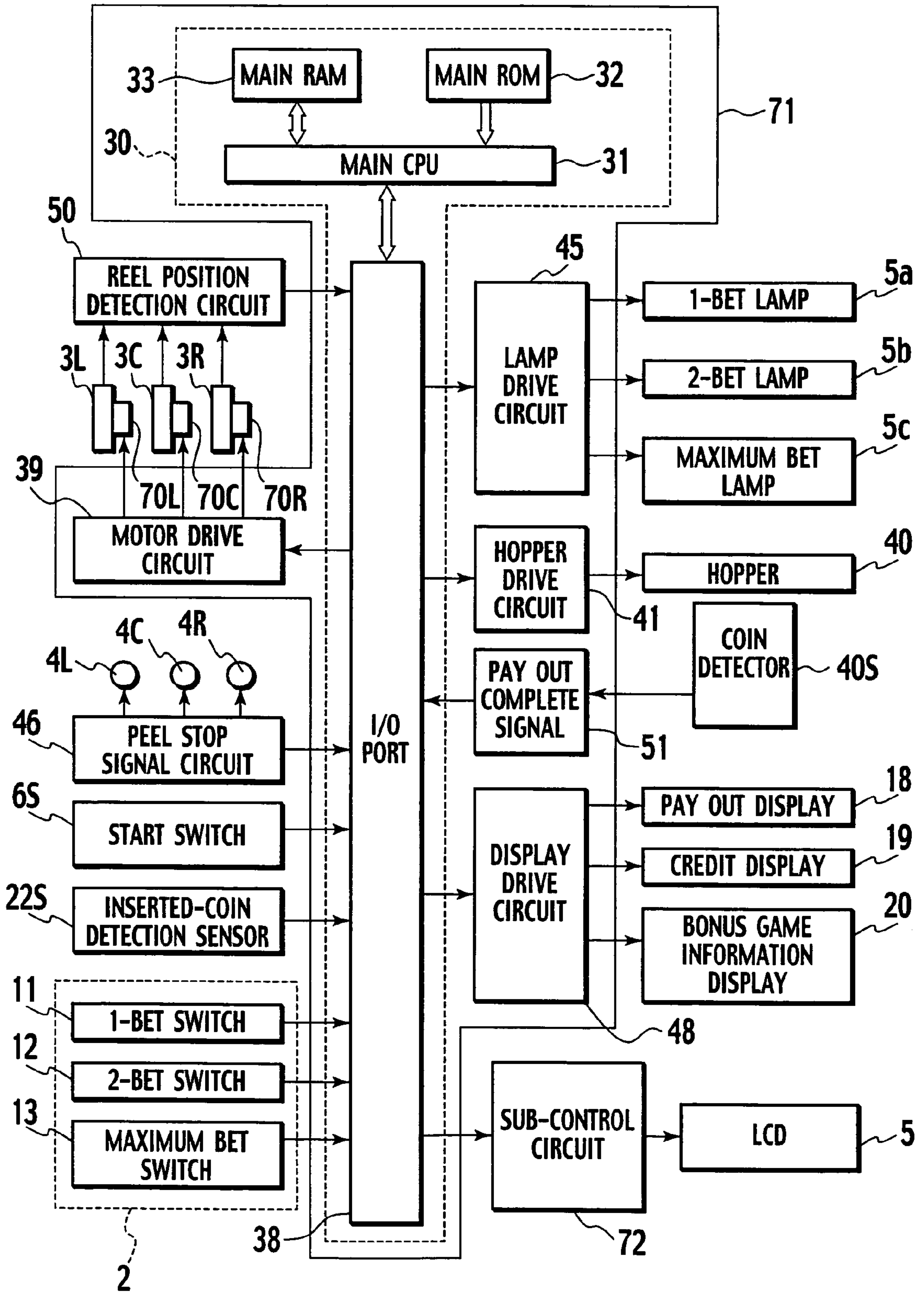
FIG. 9 is a block diagram illustrating a control system of the gaming machine of the present invention.

As shown in FIG. 9, the motor drive device of this invention includes the stepping motors 70, serving as drive sources for the reels 3 on which respective plural symbols are displayed, which are driven depending on operation commands delivered from an outside.

A micro computer 71 is comprised of a main CPU 31 (motor stop processing means), which serves as a main unit for performing control and computation, a main ROM 32 in which programs and fixed data are stored, a main RAM 33 for use in writing-in of data, and a random number generator (not shown) by which predetermined random number values are generated.

A start switch 6S that detects a start lever 9 being manipulated, a reel stop signal circuit 46 that detects stop buttons 4L, 4C, 4R being manipulated, input sections of respective BET switches 11 to 13 that allow credit coins to be betted through operations of push buttons, and output sections of a motor drive circuit 39, a lamp drive circuit 45, a hopper drive 41 and a display drive circuit 48 are connected to the main CPU 31 through a bus 38, respectively.

The motor drive circuit 39 serves to drive or stop the stepping motors 70 depending on commands delivered from the main CPU 31. Here, each stepping motor 70 includes a four-phase stepping motor with drive coils in a phase A to a phase D. Also, with the presently filed embodiment, the phases A to D are sequentially arranged in a counterclockwise direction. Additionally, the phases A and C or the phases B and D form respective pairs and one of the two phases forming the pair is supplied with electric current in a phase opposite to electric current applied to the other phase.

With the motor drive circuit 39 sequentially exciting the drive coils of the respective phases in response to command from the main CPU 31, a rotor (not shown) of the stepping motor 70 is rotationally driven.

Operation and Effect of Motor Drive Device

According to the present invention, the pivot shaft portion 76*a* has one end formed with the wall portion 76*e* extending in the direction perpendicular to the longitudinal axis of the pivot shaft portion 76*a* and the other end provided with the press section 740 with which the rotatably supported reel 3 is pressed toward the wall portion 76*e* to cause the press section 740 to apply the force to press the reel 3 on the side thereof. Thus, the motor drive device is able to minimize the reel shakings (in which the reel swings leftward or rightward as viewed from the player) of the reel 3 during start-up or stop operations of the reel 3.

Further, with the press section 740 comprised of the collar 74*b*, to be held in contact with the parts of the reel 3 or the input-side gear 72, and the spring 75 by which the rotatably supported reel 3 is pressed toward the wall portion 76*e* via the collar 74*b*, the spring 75 presses the side of the reel 3 via the collar 74*b* under a condition where the collar 74*b* is held in contact with the reel 3 or the input-side gear 72. Thus, the motor drive device makes it possible to further eliminate the reel shakings of the reel 3 during start-up or stop operations of the reel 3.

Furthermore, with the diameter of the collar 74*b* selected to be larger than that of the spring 75, the spring 75 is able to press the reel 3 along the central axis thereof while permitting the collar 74*b*, greater in diameter than the spring 75, to be held in contact with the reel 3 or the input-side gear 72. Thus, the reel 3 is enhanced to have a further increased stability during start-up or stop operations of the reel 3 and the motor drive device is able to further minimize the reel shakings of the reel 3 during start-up or stop operations of the reel 3.

Moreover, with the input-side gear 72 having one end formed with the second contacting section 721*b* held in contact with the wall portion 76*e*, the wall portion 76*e* and the second contacting section 721*b* can be held in contact with one another at all times. Thus, the reel 3 is enhanced to have a further increased stability during start-up or stop operations of the reel 3 and the motor drive device is able to further minimize the reel shakings of the reel during start-up or stop operations of the reel 3.

In addition, due to the structure where the large diameter portion 72*c* of the protrusion 72 and the outer diameter of the wall portion 76*e* are greater than the outer diameter of the spring 75, the protrusion 72 and the wall portion 76*e*, both of which are larger in diameter than the spring 75, are able to bear the force of the spring 75. Thus, the reel 3 is enhanced to have a further increased stability during start-up or stop operations of the reel 3 and the motor drive device is able to further minimize the reel shakings of the reel 3 during start-up or stop operations of the reel 3.

Besides, the stop buttons 4L, 4C, 4R shown in FIGS. 1 and 9 may be dispensed with. That is, the present invention may be implemented in an alternative structure such that after an elapse of predetermined time subsequent to the reels 3L, 3C, 3R being actuated by the start lever 9, the reels automatically stop at respective suitable stop positions.

In the foregoing, while the present invention has been described in detail with reference to the various embodiments, it will be appreciated by those skilled in the art that the present invention is not limited to particular embodiments described above. The apparatus of the present invention may be implemented in various modifications or alternative modes without departing from the sprit and scope of the present invention as defined in appended claims. Accordingly, it is intended that the particular description of the present invention is meant to be only as illustrative of the present invention and not limiting to the scope of the present invention. The scope of the invention is defined with reference to the following claims.

What is claimed is:

1. A motor drive device comprising:

a reel having a plurality of arms extending in a radial direction from a center towards a peripheral portion of the reel, each arm extending toward one lateral side of the reel when approaching the peripheral portion of the reel;

a motor accommodated in the other lateral side of the reel, the motor being located off the center axis of the reel;

a speed reduction gear which is formed in one-piece construction with the reel and transfers rotation of an output shaft of the motor to the reel with a predetermined speed reduction ratio, the speed reduction gear having a first protrusion including a first insertion hole having an outer circumferential surface engaged with the output shaft of the motor and fitted to a hole formed at the center of the reel, and a second protrusion including a second insertion hole and having one end formed with a large diameter portion;

a support member inserted into the first and second insertion holes to rotatably support the reel;

a wall portion formed on a first end of the support member in a direction perpendicular to a longitudinal direction of the support member;

a press device disposed on a second end of the support member, the press device comprising:

a first member including a third insertion hole;

a second member including a fourth insertion hole and disposed in a position opposite to the first member; and a press member disposed between the first member and the second member; and a fixing member for fixing the press device to the support member inserted into the third and fourth insertion holes, wherein the press member presses the reel toward the wall portion via the first member and presses the second member toward the fixing member, under a condition where the fixing member fixes the press device to the support member, wherein an outer diameter of the first member is greater than one of the press member and one of the hole at a contact surface of the first member held in contact with a whole of an outer end surface of the hole, wherein a space is defined among the contact surface of the first member, an inner wall of the hole and an end face of the first protrusion, and wherein an outer diameter of the large diameter portion is not less than one of the wall portion at a contact surface of the large diameter portion held in contact with the wall portion.

2. The motor drive device according to claim 1, wherein the large diameter portion and the wall portion have outer diameters larger than an outer diameter of the press member.

3. The motor drive device according to claim 1, further comprising:

an adjusting means for adjusting a pressing force of the press device.

4. The motor drive device according to claim 3, wherein the adjusting means comprises:

the press member;

the first member;

the second member concentrically aligned with the first member;

the fixing member, wherein the first and second members include inserted portions and wherein under a condition where the inserted portions are inserted into the press member, the fixing member is screwed into the support member to enable the press member to adjust the pressing force with which the part of the reel is pressed.

5. A gaming machine comprising:

a cabinet;

a reel assembled to the cabinet and having a plurality of arms extending in a radial direction from a center toward a peripheral portion of the reel, each arm extending toward one lateral side of the reel when approaching the peripheral portion of the reel;

a motor accommodated in the other lateral side of the reel, the motor being located off the center axis of the reel;

a speed reduction gear which is formed in one-piece construction with the reel and transfers rotation of an output shaft of the motor to the reel with a predetermined speed reduction ratio, the speed reduction gear having a first protrusion including a first insertion hole having an outer circumferential surface engaged with the output shaft of the motor and fitted to a hole formed at the center of the reel, and a second protrusion including a second insertion hole and having one end formed with a large diameter portion;

a support member inserted into the first and second insertion holes to rotatably support the reel;

a wall portion formed on a first end of the support member in a direction perpendicular to a longitudinal direction of the support member;

a press device disposed on a second end of the support member, the press device comprising:

a first member including a third insertion hole;

a second member including a fourth insertion hole and disposed in a position opposite to the first member; and a press member disposed between the first member and the second member; and a fixing member for fixing the press device to the support member inserted into the third and fourth insertion holes, wherein the press member presses the reel toward the wall portion via the first member and presses the second member toward the fixing member, under a condition where the fixing member fixes the press device to the support member, wherein an outer diameter of the first member is greater than one of the press member and one of the hole at a contact surface of the first member held in contact with a whole of an outer end surface of the hole, wherein a space is defined among the contact surface of the first member, an inner wall of the hole and an end face of the first protrusion, and wherein an outer diameter of the large diameter portion is not less than one of the wall portion at a contact surface of the large diameter portion held in contact with the wall portion.

* * * * *